(12) United States Patent
Hellwig et al.

(10) Patent No.: US 9,280,996 B2
(45) Date of Patent: *Mar. 8, 2016

(54) ALL-OPTICAL MAGNETIC RECORDING SYSTEM USING FEMNPT MEDIA

(71) Applicant: HGST Netherlands B.V., Amsterdam (NL)

(72) Inventors: Olav Hellwig, San Jose, CA (US); Oleksandr Mosendz, San Jose, CA (US); Dieter K. Weller, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 171 days.

This patent is subject to a terminal disclaimer.

(21) Appl. No.: 14/106,587

(22) Filed: Dec. 13, 2013

(65) Prior Publication Data

US 2015/0170696 A1    Jun. 18, 2015

(51) Int. Cl.
*G11B 5/66* (2006.01)
*G11B 7/243* (2013.01)
*G11B 5/65* (2006.01)
*G11B 7/242* (2006.01)

(52) U.S. Cl.
CPC ........ *G11B 5/653* (2013.01); *G11B 5/65* (2013.01); *G11B 5/66* (2013.01); *G11B 7/242* (2013.01)

(58) Field of Classification Search
None
See application file for complete search history.

(56) References Cited

U.S. PATENT DOCUMENTS

| | | | |
|---|---|---|---|
| 5,497,359 A | 3/1996 | Mamin et al. | |
| 6,055,220 A | 4/2000 | Mamin et al. | |
| 6,555,252 B2 * | 4/2003 | Sellmyer et al. | 428/668 |
| 6,982,845 B2 * | 1/2006 | Kai et al. | 360/59 |
| 8,040,760 B2 * | 10/2011 | Challener et al. | 369/13.29 |
| 8,154,957 B1 * | 4/2012 | Katsnelson et al. | 369/13.01 |
| 8,164,988 B2 | 4/2012 | Stipe | |
| 8,345,516 B2 * | 1/2013 | Rasing et al. | 369/13.24 |
| 8,526,288 B2 * | 9/2013 | Lee et al. | 369/112.27 |

(Continued)

FOREIGN PATENT DOCUMENTS

JP    61-066244    5/1986

OTHER PUBLICATIONS

Xu et al., "Effects of Mn doping on temperature-dependent magnetic properties of L10 FeMnPt", Journal of Applied Physics 109, 07B747 (2011).

(Continued)

*Primary Examiner* — Kevin Bernatz
(74) *Attorney, Agent, or Firm* — Thomas R. Berthold

(57) ABSTRACT

An "all optical switching" (AOS) magnetic recording system, i.e., one that does not require a magnetic field to reverse the magnetization in the magnetic recording media, uses a FeMnPt $L1_0$ alloy as the magnetic media. A FeMnPt alloy, with appropriate amounts of Mn, will have high magneto-crystalline anisotropy, but also ferrimagnetic spin alignment for triggering AOS. The combination of high magneto-crystalline anisotropy and ferrimagnetic spin configuration enables the FeMnPt media to function as magnetic media whose magnetization can be switched solely by polarized laser pulses. The FeMnPt media for may be a single layer with or without any segregants. Alternatively, the FeMnPt media may be a multilayered recording layer comprising alternating layers of FePt and MnPt $L1_0$ ordered alloys. The segregant-free embodiments of the FeMnPt material may be patterned to form bit-patterned-media (BPM).

18 Claims, 9 Drawing Sheets

(56) References Cited

U.S. PATENT DOCUMENTS

| | | | |
|---|---|---|---|
| 2008/0074776 A1 | 3/2008 | Soeya | |
| 2011/0199867 A1* | 8/2011 | Stipe | 369/13.24 |
| 2012/0307398 A1 | 12/2012 | Kanbe et al. | |
| 2014/0368303 A1* | 12/2014 | Rasing et al. | 335/284 |

OTHER PUBLICATIONS

Meyer et al., "Effective electron-density dependence of the magnetocrystalline anisotropy in highly chemically ordered pseudobinary Fe1-xMnx . . . 50Pt50 L10 alloys", Physical Review B 73, 214438 (2006).

Li et al., "Femtosecond switching of magnetism via strongly correlated spin-charge quantum excitations", Nature vol. 496 Apr. 4, 2013 69.

Burkert et al., "Magnetic anisotropy of L10 FePt and Fe1-xMnxPt", Physical Review B 71, 134411 (2005).

Stanciu et al., "All-Optical Magnetic Recording with Circularly Polarized Light", PRL 99, 047601 (2007).

Rebei et al., "The magneto-optical Barnett effect: Circularly polarized light induced femtosecond magnetization reversal", Physics Letters A 372 (2008) 1915-1918.

Hansteen et al., "Nonthermal ultrafast optical control of the magnetization in garnet films", Physical Review B 73, 014421 (2006).

Hansteen et al., "Femtosecond Photomagnetic Switching of Spins in Ferrimagnetic Garnet Films", PRL 95, 047402 (2005).

Sun et al., "Directional short range order in L10 FeMnPt magnetic thin films", Physical Review B 84, 140408(R) (2011).

Hohlfeld et al., "A thermal All-Optical Femtosecond Magnetization Reversal in GdFeCo", Cite as: arXiv:0902.3800 [cond-mat.mtrl-sci].

Gong et al., "Non-thermal excitation and control of magnetization in Fe/GaAs film by ultrafast laser pulses", Journal of Applied Physics 111, 07D505 (2012).

Kimel et al., "Laser-induced ultrafast spin reorientation in the antiferromagnet TmFeO3", Nature 429, 850-853 (Jun. 24, 2004) (Abstract Only).

Ostler et al., "Ultrafast heating as a sufficient stimulus for magnetization reversal in a ferrimagnet", Nature Comm. 3, 666 (2012).

Fullerton et al., "Magneto-photonics at the Nanoscale for Heat Assisted Magnetic Recording", UCSD-2011-065—Project Review, Mar. 2013 at Advanced Storage Technology Consortium; http://www.idema.org/?page_id=5303.

* cited by examiner

ALL-OPTICAL MAGNETIC RECORDING SYSTEM USING FEMNPT MEDIA

BACKGROUND OF THE INVENTION

1. Field of the Invention

This invention relates generally to magnetic recording systems, like magnetic recording disk drives, and more particularly to an all-optical magnetic recording system that does not require an external magnetic field to switch the magnetization of the data bits.

2. Description of the Related Art

The more recent commercially available magnetic recording hard disk drives (HDDs) use perpendicular recording disks, wherein the magnetized regions are oriented perpendicular to the plane of the recording layer of the disk. The conventional perpendicular magnetic recording disk is a "continuous-media" (CM) disk wherein the recording layer is a continuous layer of magnetic material with perpendicular magnetic anisotropy that becomes formed into concentric data tracks containing the magnetically recorded data bits when the write head writes on the magnetic material. The read/write head is located on an air-bearing slider that is supported above the smooth disk surface on a thin film of air or "air-bearing" as the disk rotates.

Perpendicular magnetic recording disks with "bit-patterned media" (BPM) have been proposed to increase the data density. In BPM disks, the magnetic material on the disk is patterned into small isolated data islands such that there is a single magnetic domain in each island or "bit". The single magnetic domains can be a single grain or consist of a few strongly coupled grains that switch magnetic states in concert as a single magnetic volume. This is in contrast to conventional CM disks wherein a single "bit" may have multiple magnetic grains separated by segregant material. For both CM and BPM disks, the magnetized regions or the individual data islands have their magnetizations switched by an external magnetic field from the disk drive's write head.

Recently, all-optical systems have been proposed that do not require an external magnetic field to switch the magnetization state of the media. The feasibility of all-optical systems has been demonstrated by several research groups using ferrimagnetic rare earth-transition metal (RE-TM) materials, for example GdFeCo alloys. It was shown that the reversal of the magnetization is achieved by applying a short laser pulse in the absence of an external magnetic field. However usage of these RE-TM materials in HDDs is not practical because they have limited magnetic anisotropy. Also, these materials are prone to corrosion due to their very strong affinity to oxygen. For example, the use of conventional HDD read heads requires at current areal densities a very close head-to-media spacing so that the thickness of the protective overcoat on the media must be less than 5 nm, which is not enough to prevent oxidation of RE-TM materials.

What is needed is an all-optical magnetic recording system with improved magnetic media.

SUMMARY OF THE INVENTION

Embodiments of this invention relate to an "all optical switching" (AOS) magnetic recording system, i.e., one that does not require a magnetic field to reverse the magnetization of regions of the CM disk or the individual islands of a BPM disk. Embodiments of the invention use a FeMnPt $L1_0$ alloy as the magnetic media. A FeMnPt alloy, with appropriate amounts of Mn, will have high magneto-crystalline anisotropy, but also ferrimagnetic spin alignment for triggering AOS. In this material the Mn partially substitutes for the Fe in the well-known FePt $L1_0$ material. The Mn spins will align antiparallel to the Fe and thus form a ferrimagnetic phase. The combination of high magnetic anisotropy and ferrimagnetic spin configuration enables the FeMnPt media to function as magnetic media whose magnetization can be switched solely by polarized laser pulses. Additionally, the high Pt concentration makes the material corrosion resistant. The FeMnPt media for CM may be a single layer with or without any segregants. Alternatively, the FeMnPt media may be implemented as a multilayered recording layer comprising alternating layers of FePt and MnPt $L1_0$ ordered alloys. In the layered embodiment, the FePt and MnPt may also have added segregants. The segregant-free embodiments of the FeMnPt material used for CM may also be patterned to form bit-patterned-media (BPM), using any of the known techniques for patterning continuous layers into discrete isolated data islands.

For a fuller understanding of the nature and advantages of the present invention, reference should be made to the following detailed description taken together with the accompanying figures.

DETAILED DESCRIPTION OF THE INVENTION

Embodiments of this invention relate to an "all optical switching" (AOS) magnetic recording system, i.e., one that does not require a magnetic field to reverse the magnetization of regions of the CM disk or the individual islands of a BPM disk. One mechanism for switching magnetization with light is the inverse Faraday effect (IFE). The Faraday effect is a magneto-optic phenomenon in which the longitudinal polarization direction of light traveling through a material is rotated in a magnetic field aligned parallel to the light propagation direction. In the IFE, circularly polarized light induces a magnetic field in a material parallel to the light propagation direction. A static magnetization $\vec{M}(0)$ is induced in the material by an external rotating electric field with the frequency ω, which can be achieved with a high-intensity circularly polarized laser pulse. The induced magnetization is proportional to the vector product of $\vec{E}$ and $\vec{M}^*$, the electric field of the light wave and its complex conjugate, respectively:

$$\vec{M}(0) \propto [\vec{E}(\omega) \times \vec{E}^*(\omega)] \quad \text{Equation (1)}$$

Figure 1C:
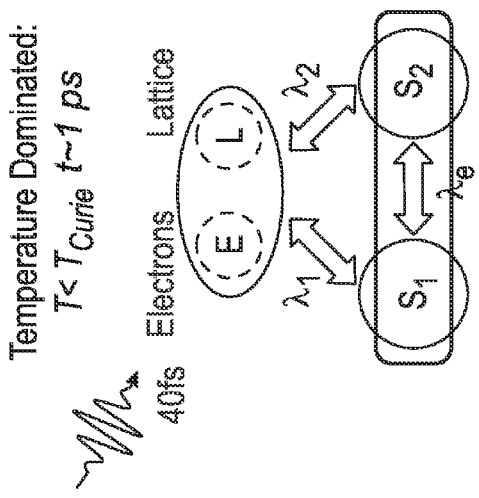
FIGS. 1A-1C are diagrams for explaining the mechanism of all-optical switching for a RE-TM material like a GdFe system.
Figure 1B:
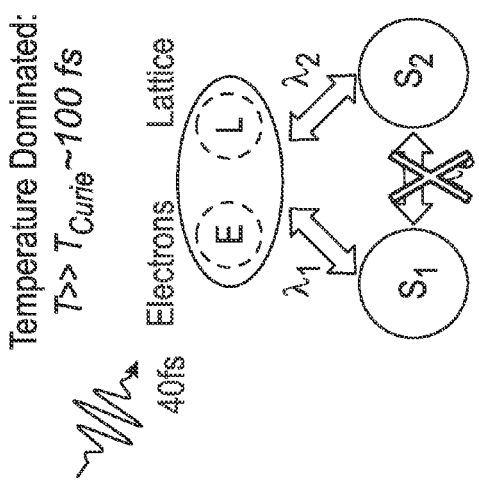
Figure 1A:
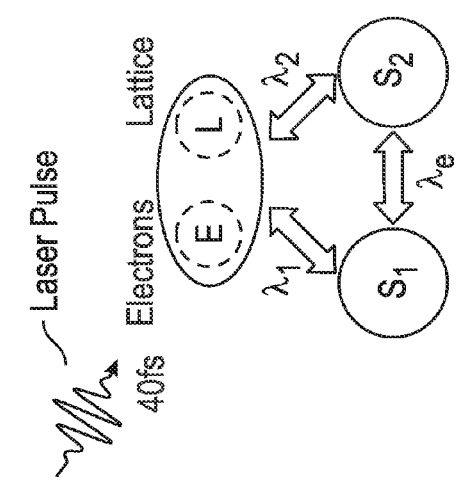
Figure 2A:
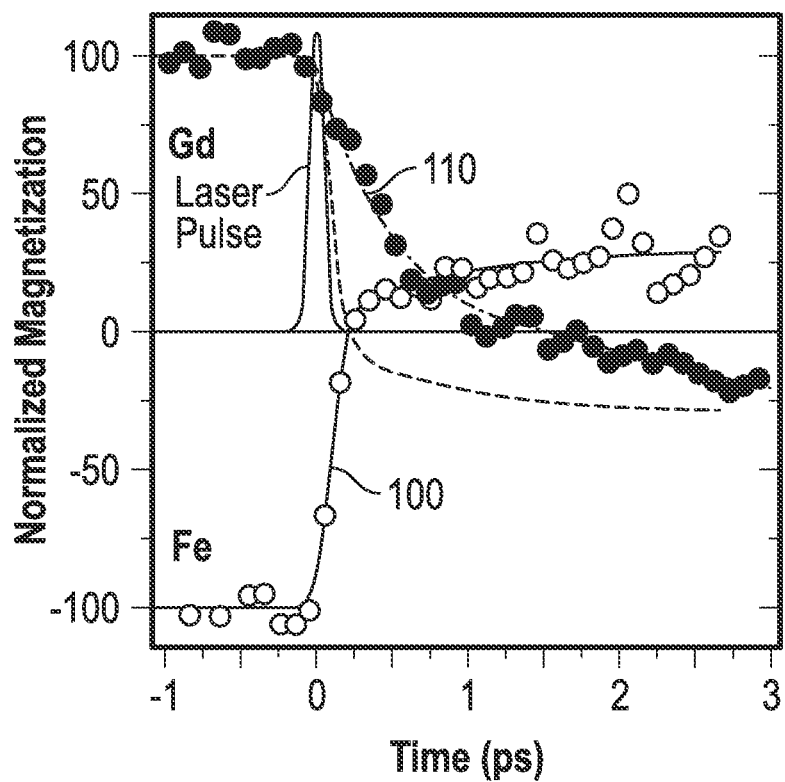
FIGS. 2A-2B are diagrams for explaining the mechanism of all-optical switching for a RE-TM material like a GdFe system.
Figure 2B:
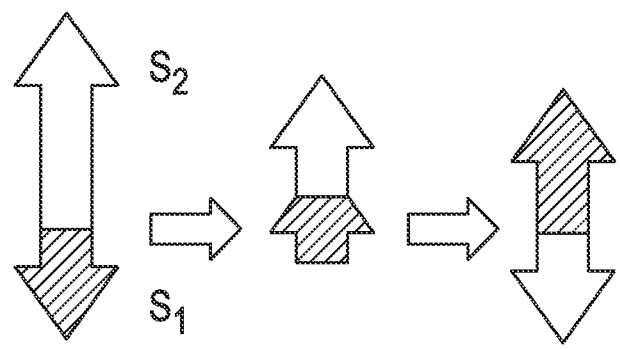

Another mechanism for switching magnetization with light involves antiferromagnetic (AF) coupling. In this mechanism an ultrafast laser pulse brings the electron temperature above the level where spin-spin interaction/coupling are active and causes demagnetization, after which AF coupling during cooling reverses the magnetization. The feasibility of all-optical switching has been demonstrated by several research groups using ferrimagnetic rear earth-transition metal (RE-TM) materials, for example GdFeCo alloys. It was shown that the reversal of the magnetization is achieved by applying a short laser pulse in the absence of an external magnetic field. The mechanism of AOS for a RE-TM material like a GdFe system is explained in FIGS. 1A-1C and 2A-2B, which are reproduced from T. Ostler et al, *Nature Comm.* 3, 666 (2012). A ferrimagnetic material has two magnetic sub-lattices which have their spins aligned antiparallel; however the magnitude of the magnetic moment of the first sub-lattice is larger than that of the second. Thus the material possesses a final net magnetic moment, which is used to read out the magnetic state and store and retrieve the data. GdFe is a ferrimagnetic material with S1 and S2 representing spins of Fe and Gd. In FIG. 1A a fast laser pulse interacts with the electron lattice of the material and within 10-100 femtoseconds (fs) increases the electron temperature above the material's Curie temperature $T_{Curie}$ (FIG. 1B). This temperature increase decouples the two ferrimagnetically aligned sub-lattices and allows them to respond to the heat pulse independently. Due to the high electronic temperature Fe and Gd undergo a fast demagnetization, which reduces the magnetic moments of the two sub-lattices. Since Fe and Gd have a different electronic structure the speed of the demagnetization process of these two sub-lattice species is different and they will lose their magnetic moment at different rates. In this example the Fe sub-lattice magnetization decays faster than the magnetization of the Gd sub-lattice, as shown by curves 100, 110 in FIG. 2A. An important phenomenon occurs during this fast demagnetization. The magnetic moment of the Fe does not approach a zero value at the end of the demagnetization process, but rather a small but finite value in the direction opposite to its initial orientation. Due to this effect for a short time, 0.1-1 picoseconds (ps), the spins S1 and S2 and thus the magnetic moments of both sub-lattices become oriented in the same direction (FIG. 2B, middle portion). When the electron temperature reduces below $T_{Curie}$ i.e., cooling about 1 ps after the laser pulse, the exchange interactions between the two sub-lattices is restored and the spins align again in opposite directions with respect to each other, thus forcing Gd to reverse its magnetization as well (FIG. 2B, right portion). With further cooling towards room temperature the magnetic moments of both sub-lattices are fully restored, but are now oriented in the opposite direction to the initial state before the laser pulse was applied (FIG. 1C). The magnetic moments are now antiferromagnetically exchange coupled (FIG. 1C). Thus the reversal process is initiated with a thermal pulse, which leads to different fast demagnetization of the two sub-lattices and then completed by restoring the antiferromagnetic exchange coupling of the two sub-lattices during the cooling process.

However, usage of a RE-TM material like a GdFeCo alloy in HDDs is not practical for several reasons: (a) low magnetic anisotropy of alloys like GdFeCo do not allow high areal density, and (b) rare earth materials like Gd are usually prone to corrosion due to the very strong affinity of rear earth materials to oxygen.

Embodiments of the invention use a FeMnPt alloy as the magnetic media in an AOS system. Chemically-ordered FePt, ordered in $L1_0$, has high magneto-crystalline anisotropy but is a purely ferromagnetic material. MnPt is a pure antiferromagnetic material, meaning that it does not possess a finite magnetic moment, i.e., it has full compensation of spin up and spin down moments. MnPt has the same crystal $L1_0$ structure as FePt. As a consequence of this it can be fairly well alloyed with FePt or sequentially deposited with FePt $L1_0$ films in a multilayered structure that is well lattice matched. Thus it is believed that a FeMnPt $L1_0$ alloy, with appropriate amounts of Mn, will have high magneto-crystalline anisotropy, but also ferrimagnetic spin alignment for triggering AOS. In this material the Mn will partially substitute for the Fe in the well-known FePt $L1_0$ material. The Mn spins will align antiparallel to the Fe and thus form a ferrimagnetic phase, which enables the material to function similar to the above-described GdFe alloy system. A combination of high magnetic anisotropy and ferrimagnetic spin configuration enables the FeMnPt media to function as magnetic media whose magnetization can be switched solely by polarized laser pulses. Additionally, the high Pt concentration makes the material corrosion resistant. This material possesses high magnetic anisotropy and can be implemented in fairly straightforward way since its crystallography is very similar to well-known $L1_0$ FePt media proposed for heat-assisted magnetic recording (HAMR). The FeMnPt media can be implemented into a media stack for continuous media (CM). The FeMnPt CM may be a single layer without any segregants. Alternatively, the CM may be a single layer of FeMnPt with one or more segregants, typically C, B, BN, SiN and CrN and oxides like SiOx, TiOx, TaOx and CrOx. The FeMnPt grains will be decoupled due to the physical isolation by the surrounding segregants and can be recorded independently. The antiparallel Mn and Fe spins can also be achieved by a multilayered recording layer comprising alternating layers of FePt and MnPt $L1_0$ ordered alloys. In the layered embodiment, the FePt and MnPt may also have added segregants to magnetically decouple the grains. The segregant-free embodiments used for CM may also be patterned to form bit-patterned-media (BPM), using any of the known techniques for patterning continuous layers into discrete isolated data islands.

Figure 3A:
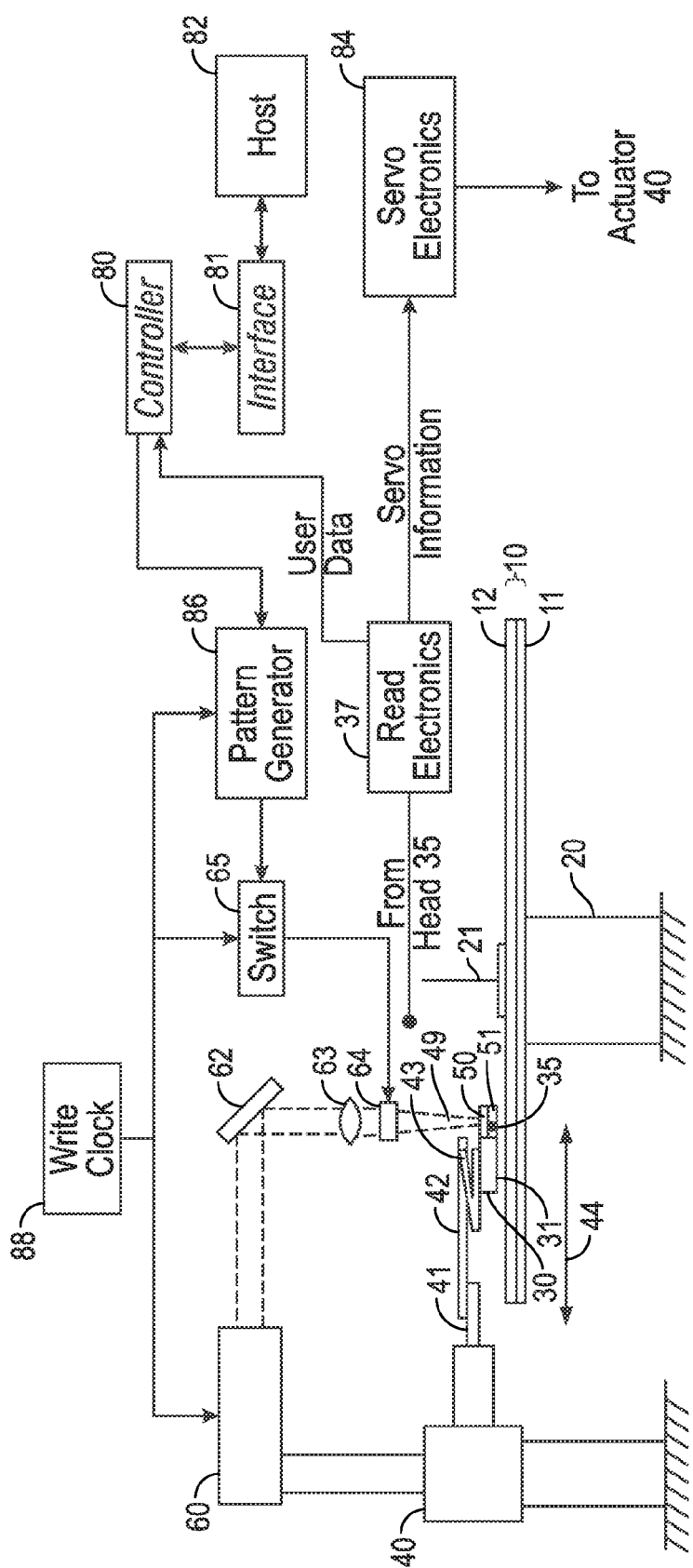
FIG. 3A is a schematic diagram of an all-optical magnetic recording system according to embodiments of the invention.

FIG. 3A is a schematic diagram of an all-optical magnetic recording system according to embodiments of the invention. The system is fully applicable to disks with CM or BPM. The magnetic recording medium 10 is a substrate 11 with a generally planar surface and the FeMnPt recording layer 12, which may be any of the embodiments of the FeMnPt media described below. In a HDD embodiment, like that depicted in FIG. 3A, the medium 10 is a rotatable disk 10 that is supported on a spindle motor 20 that rotates about an axis 21. In a CM disk, the recording layer 12 contains concentric circular data tracks that are formed when the regions of the disk are magnetized with the polarized laser pulses. In a BPM disk, the discrete magnetic bits or islands of recording layer 12 are arranged in concentric circular data tracks.

The spindle motor 20 may be a commercially available disk drive spindle motor with very low non-repeatable runout. A carrier 30 has an air-bearing surface (ABS) 31 that faces the disk 10 and supports the carrier 30 in very close proximity, e.g., about 2 to 20 nm above the disk 10. The carrier 30 supports an optical channel 50 and a near-field transducer 51 that outputs circularly polarized laser light to the regions or islands of the recording layer 12 to magnetize the regions or islands. The carrier 30 also supports a read head 35, such as a conventional magnetoresistive read head, that detects or reads the magnetized regions or islands and provides a readback signal. The carrier 30 is connected to a carrier actuator 40 that includes a rigid arm 41 and a suspension that includes load beam 42 and flexure 43. The suspension may be a conventional suspension like that used in magnetic recording disk drives, wherein the flexure 43 allows the carrier 30 to "pitch" and "roll" while it is supported above the rotating disk by the ABS 31.

The carrier 30 is movable by actuator 40 in a radial direction perpendicular to axis 21, as shown by arrow 44. The actuator 40 may be either a linear actuator that moves the carrier 30 along a purely radial line or a rotary actuator, such as a rotary voice-coil-motor (VCM) actuator, that rotates the carrier 30 along a generally radial or arcuate path. The actuator 40 positions the carrier 30 to the desired individual data tracks.

The optical system of the magnetic recording system of FIG. 3A includes laser 60, mirror 62, focusing lens 63, and circular polarizer 64. The laser 60 generates linearly polarized light and may be collimated, particularly if laser 60 is a diode laser. The circularly polarized light beam 49 is directed to optical channel 50 and transducer 51. The laser 60, mirror 62, focusing lens 63 and circular polarizer 64 may be attached to the actuator 40 so that the laser light is always directed to the transducer 51 as the carrier 30 moves generally radially. The focusing lens 63 may also be located on or incorporated into the carrier 30. Alternatively, the light from laser 60 may be delivered to the transducer 51 by an optical fiber. The circular polarizer 64 may be a conventional optical device like a quarter wave plate cemented to the back of a linear polarizer with a specific orientation such that the light emerging from the quarter wave plate is circularly polarized. The transducer 51 may be a near-field transducer (NFT).

In FIG. 3A, the item labeled "switch 65" is meant to represent any device or system that can supply laser pulses to the optical channel 50 with circular polarization in one of two opposite directions, i.e., right-handed or left-handed polarization so that the direction of perpendicular magnetization of the magnetized region or data island exposed to the output of transducer 51 can be switched to one of two opposite perpendicular directions.

The wavelength of light from laser 60 may be selected from a range of wavelengths. Laser 60 is preferably a diode laser, like those similar to CD-RW type laser diodes, with a wavelength in the range of approximately 780 nm to 980 nm. Other types of lasers may be used, such as DVD-RW type laser diodes, with a wavelength of approximately 650 nm, and Blu-ray type laser diodes, with a wavelength of approximately 400 nm. Short pulses, as short as 1 femtosecond (fs), are generated, if needed, by applying a short electrical pulse to the diode contacts.

FIG. 3A also shows schematically the transfer of user data between a host system, such as a PC, and the disk drive. The disk 10 contains not only recorded user data but pre-recorded non-data servo information that is used by the actuator 40 to maintain the carrier 30 on the desired track and to move the carrier 30 to different tracks. The signals from both user data and servo information are detected by the read head 35 and amplified and decoded by read electronics 37. User data is sent to controller electronics 80 and through interface electronics 81 to the host 82, and servo information is sent to servo electronics 84 which is coupled to the actuator 40. The data to be written to the disk is sent from the host 82 to interface electronics 81 and controller electronics 80 and then as a data queue to pattern generator 86 and then to switch 65. The switch 65 controls the direction of circular polarization to the transducer 51 to magnetize regions of the CM disk or the individual islands of the BPM disk in the desired perpendicular direction according to the pattern of the data queue. The pattern generator 86, switch 65 and laser 60 are controlled by a write clock 88.

Figure 3B:
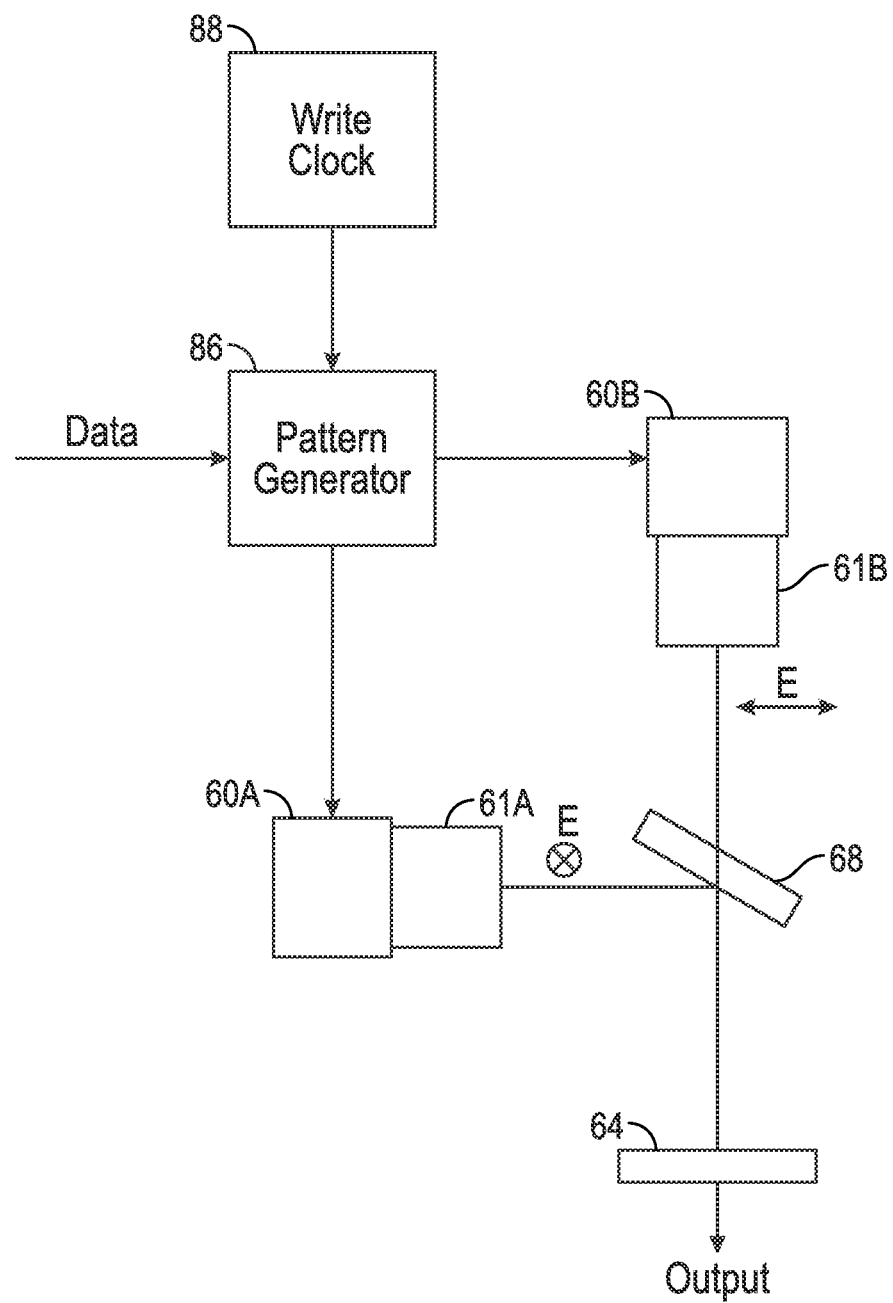
FIG. 3B is a schematic diagram of a system for switching the direction of circular polarization of the light to the transducer in the all-optical magnetic recording system according to embodiments of the invention.

FIG. 3B is a schematic diagram of a system that may serve as switch 65 (FIG. 3A) for switching the direction of circular polarization of the light to the transducer in the all-optical magnetic recording system. In this system there are two lasers 60A, 60B, with respective collimators 61A, 61B, that generate two beams linearly polarized in orthogonal directions, as shown by E field in the plane of the paper for the beam from collimator 61B and E field orthogonal to the plane of the paper for the beam from collimator 61A. The two beams are directed to a beam splitter 68 and then to circular polarizer 64, which may be a conventional optical device like a quarter wave plate. The output from circular polarizer 64 is directed to the optical channel 50 (FIG. 3A). The lasers 60A, 60B generate pulses in response to pattern generator 86, which is controlled by write clock 88. The pattern generator 86 triggers pulses from lasers 60A, 60B, which are linearly polarized in orthogonal directions, so that the output from circular polarizer 64 can be either right-handed or left-handed, depending on which laser was pulsed. This enables the data islands to be magnetized in one of two opposite perpendicular directions.

Figure 3C:
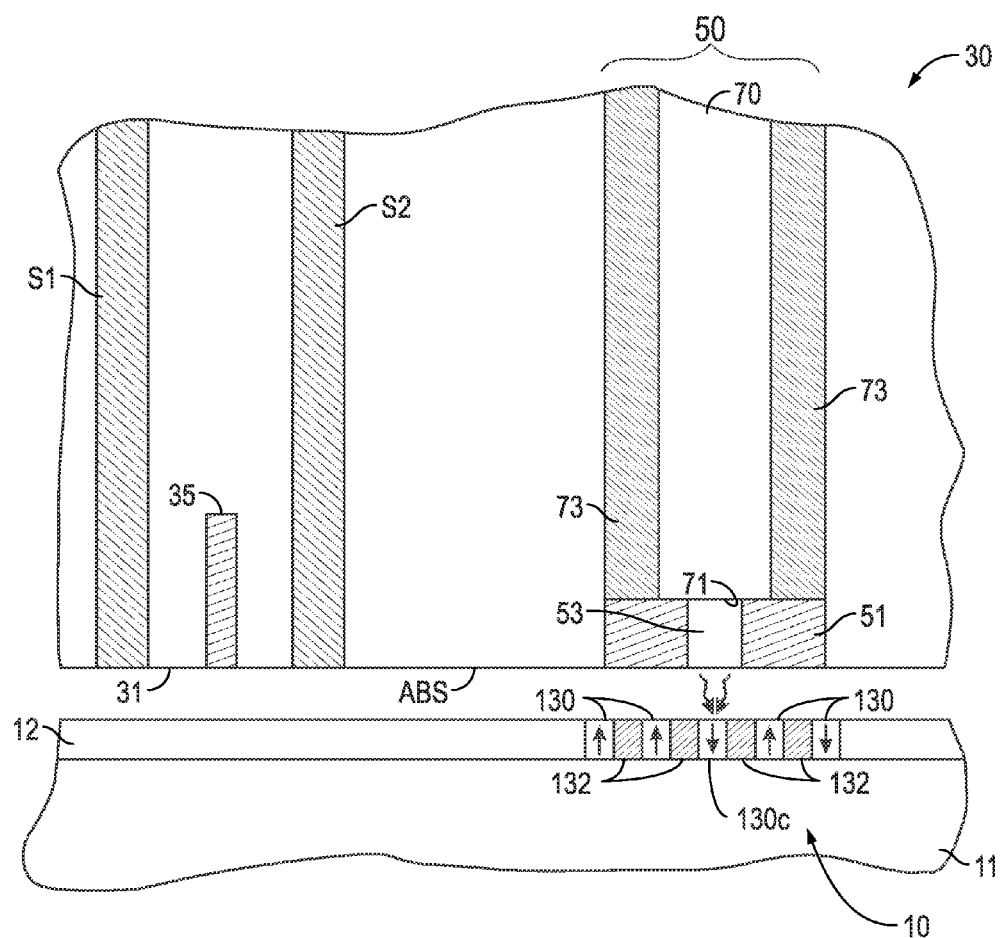
FIG. 3C is an enlarged view of a portion of the disk and carrier with supported read head and near-field transducer according to an embodiment of the invention.

FIG. 3C is an enlarged view of a portion of disk 10 and carrier 30 showing the read head 35, the near-field transducer 51 and the optical channel 50. The disk 10 is shown as a BPM disk with a data track in the RL 12 having a series of representative magnetized metal or metal alloy data islands 130 separated by nonmagnetic non-metallic spaces 132 on the disk substrate 11. The carrier 30 may be a slider, like that used in conventional magnetic recording disk drives, that has a generally planar ABS 31 facing the disk 10. The carrier 30 does not support an inductive write head for generating a magnetic field because the magnetizations of the magnetized regions or islands on the disk 10 are switched solely by the polarized laser light. The read head 35, which may be a conventional tunneling magnetoresistive (TMR) read head, has its sensing edge substantially at the ABS and is located between two magnetic shields S1, S2. In this embodiment the optical channel 50 is a thin film waveguide 70 that directs circularly polarized light to the transducer 51. The waveguide 70 is formed of a core material such as $Ta_2O_5$, $TiO_2$ or SiN that is transmissive to light at the wavelength of the laser and is surrounded by a dielectric cladding layer 73 (for example $SiO_2$ or $Al_2O_3$) of lower refractive index than the core material. The laser may a CD-RW type laser diode, with a wavelength of approximately 780 nm, and located on the actuator 40, as depicted in FIG. 3A. Alternatively, the laser diode may be located on the carrier 30. In one example, the waveguide 70 may be approximately 250 nm in diameter or cross-sectional dimension with a 500 nm thick cladding layer 73 surrounding it. The waveguide 70 has an exit face 71 in contact with the transducer 51. The transducer 51 is a metal (which may include a metal alloy) with an active region 53. The metal transducer 51 may be in the form of a film on the end of waveguide 70. Circularly polarized light travels through waveguide 70 to exit face 71 and to active region 53. The active region 53 of transducer 51 generates a rotating electric field in the near-field that interacts with the data island 130c, as depicted by the wavy arrows. The transducer 51 with active region 53 is a "near-field" transducer (NFT), which as used herein refers to "near-field optics" wherein the passage of light is through an element with subwavelength features and the light is coupled to a second element located a subwavelength distance from the first.

In FIGS. 3A and 3C, the means for directing the laser light to the RL 12 is a waveguide on carrier 30. However, the means for directing the laser light to the RL may also be a light-transmissive portion of carrier 30 that receives the circularly polarized light beam 49. The optical channel may also be located within an opening in the body of the carrier 30. The optical channel may also be a solid immersion lens (SIL) on the carrier 30. Air-bearing sliders with hemispherical and super-hemispherical SILs for optical data recording are described in U.S. Pat. No. 5,497,359 and U.S. Pat. No. 6,055,220. Numerous other techniques and structures for attachment of the optical channel to an air-bearing slider or carrier are possible.

FIGS. 3A-3C thus illustrate one type of an AOS system, i.e, one that uses circular polarization in one of two opposite directions, i.e., right-handed or left-handed polarization so that the direction of perpendicular magnetization can be switched to one of two opposite perpendicular directions. However, the BPM embodiments of this invention are also fully applicable to an AOS system that uses linear polarization. In such a system, the magnetization is switched every time a pulse is applied in a certain intensity range, so the final state depends on what the original state was. Thus it is necessary to read the magnetic state for each bit before writing it to determine if it needs to be switched or not. In a BPM system, the physical location of the individual data islands is known so it is possible to determine the magnetic state of an individual data island and then reliably switch its magnetization.

Figure 4A:
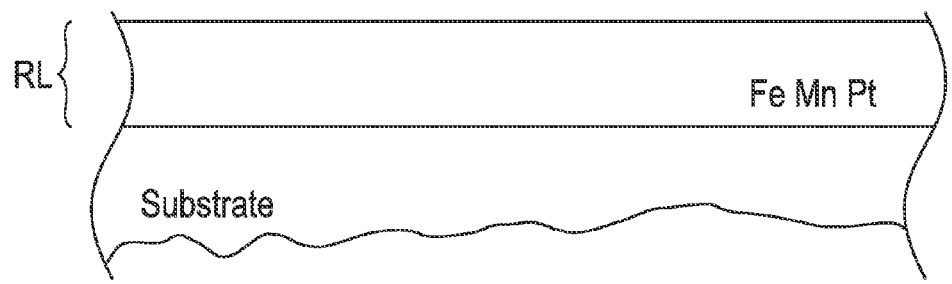
FIG. 4A is a sectional view of the FeMnPt recording layer (RL) as a single layer of continuous media (CM) without any segregants.

FIG. 4A is a sectional view of the FeMnPt media as a single layer of continuous media (CM) without any segregants. The recording layer (RL) is formed on a suitable disk substrate. The disk may also typically include one or more seed layers below the RL and a protective overcoat, such as amorphous diamond-like carbon (DLC), on top of the RL. The FeMnPt perpendicular media that forms the RL is a high-$H_k$ substantially chemically-ordered FeMnPt pseudo-binary alloy based on the FePt $L1_0$ phase. The Mn partially substitutes for the Fe and is present in a preferred range of between about 1 to about 15 atomic percent. The preferred composition would thus be represented as $(Fe_{(50-x)}Mn_xPt_{(50)})$ where x is in atomic percent and is between 1 and 15. However, the amount of Pt and the amount of combined FeMn can be between about 45 and 55 atomic percent. Thus the composition may be represented as $(Fe_{(100-x)}Mn_x)_yPt_{(100-y)}$, where y is between about 45 and 55 and x is between about 2 and 30. The Mn concentration must be sufficient to provide enough AF coupling with the Fe. While this minimum amount of Mn has not yet been experimentally determined it is believed to be at least 1 atomic percent. However, if the Mn concentration is greater than about 15 atomic percent then the Mn would degrade the magnetic properties and the FeMnPt media would not have sufficient magneto-crystalline anisotropy. Alloys of FePt ordered in $L1_0$ are known for their high magneto-crystalline anisotropy and magnetization, properties that are desirable for high-density magnetic recording materials. The substantially chemically-ordered FePt alloy, in its bulk form, is known as a face-centered tetragonal (FCT) $L1_0$-ordered phase material (also called a CuAu material). The c-axis of the $L1_0$ phase is the easy axis of magnetization and is oriented perpendicular to the disk substrate. In this FeMnPt alloy, the Mn partially substitutes the Fe in the well-known FePt $L1_0$ material. The Mn spins align antiparallel to the Fe and thus form a ferrimagnetic phase as required for AOS.

Figure 4B:
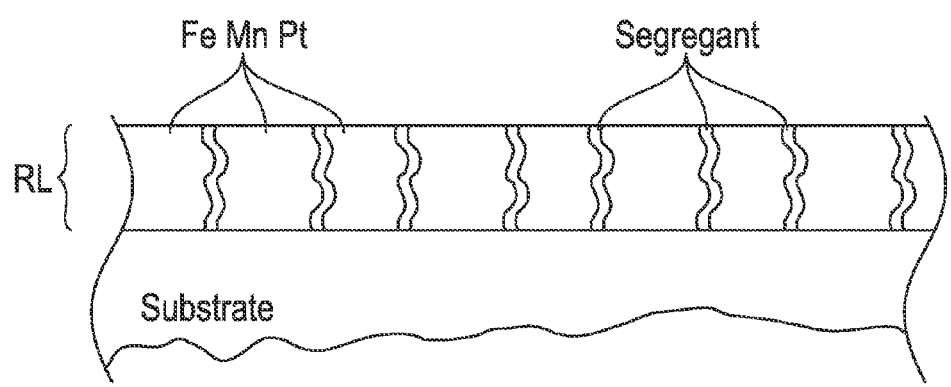
FIG. 4B is a sectional view of the FeMnPt RL as a single layer of continuous media (CM) with segregants.

FIG. 4B is a sectional view of the FeMnPt media as a single layer of continuous media (CM) with segregants. The FeMnPt perpendicular media that forms the RL would have a composition of approximately $(Fe_{(50-x)}Mn_xPt_{(50)})$-M where x is in atomic percent and is between 1 and 15, and the element M is present in an amount between about 5 and 50 atomic percent. Typical materials for the segregants include C, B, BN, SiN, CrN and oxides like SiOx, TiOx, TaOx and CrOx. The RLs in FIGS. 4A and 4B may be formed by sputter deposition on a substrate maintained at temperature between about 400-700° C. The RL is sputter deposited to a thickness of between about 5 to 15 nm. The FeMnPt (or FeMnPt-M) RLs may be sputter deposited from a single composite target having the desired amounts of Fe, Mn and Pt, (or these elements with the desired amounts of M segregants), or co-sputtered from separate targets.

Figure 5A:
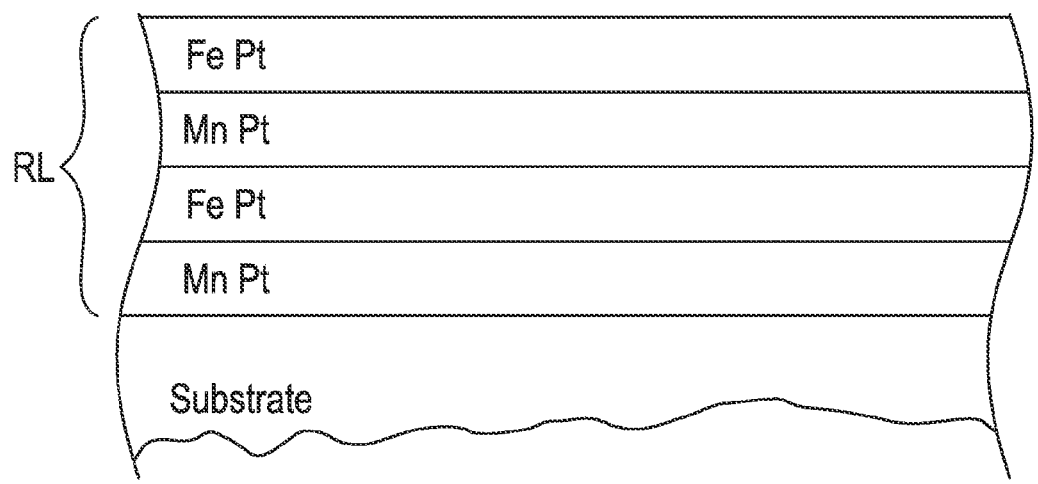
FIG. 5A is a sectional view of the FeMnPt RL as a multi-layer of continuous media (CM) without any segregants.

FIG. 5A is a sectional view of the FeMnPt RL as a multilayer of continuous media (CM) without any segregants. The multilayer RL includes alternating layers of at least one segregant-free FePt layer and at least one segregant-free MnPt layer. The number and thicknesses of the individual layers may be chosen to achieve the desired total RL thickness (typically 5 to 15 nm) and Mn concentration. For example, if it is desired to achieve $Fe_{40}Mn_{10}Pt_{50}$ (i.e., about 10 atomic percent Mn in the RL), then the ratio of thicknesses of the FePt to MnPt layers would be about 4.

Figure 5B:
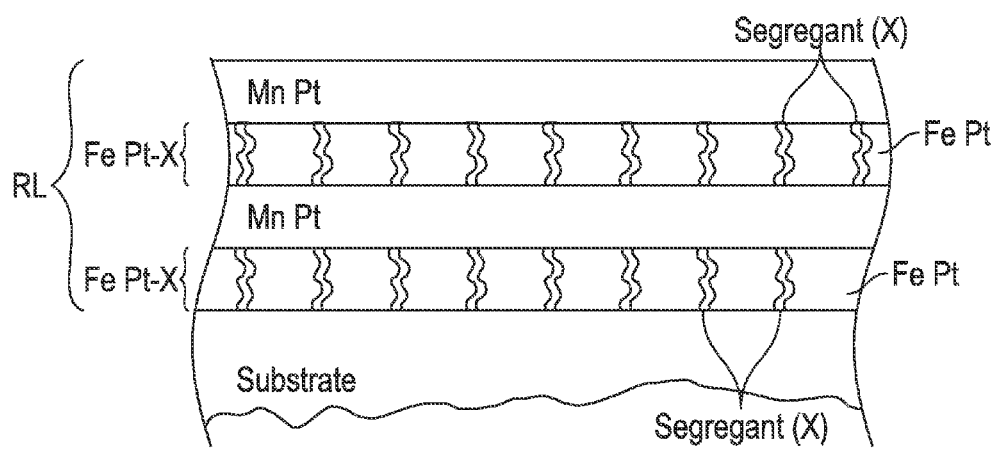
FIG. 5B is a sectional view of the FeMnPt RL as a multi-layer of continuous media (CM) with the FePt layers containing one or more segregants and the MnPt layers being segregant-free.
Figure 5C:
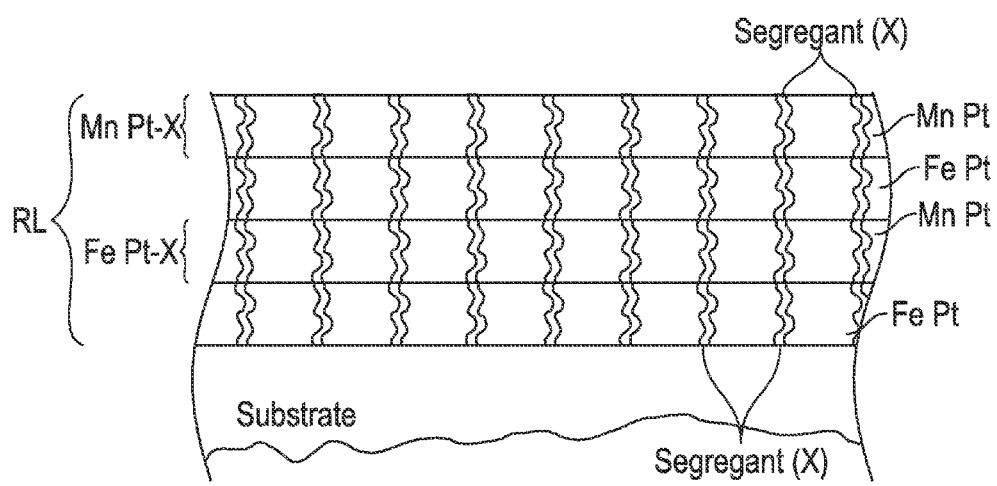
FIG. 5C is a sectional view of the FeMnPt RL as a multi-layer of continuous media (CM) with both the FePt and MnPt layers containing one or more segregants.

FIG. 5B is a sectional view of the FeMnPt RL as a multilayer of continuous media (CM) with the FePt layer containing one or more M segregants and the MnPt layers being segregant-free. FIG. 5C is a sectional view of the FeMnPt RL as a multilayer of continuous media (CM) with both the FePt and MnPt layers containing one or more M segregants. The segregants may be selected from the same group and be present in the same composition range as described above for the embodiment of FIG. 4B. The RLs in FIGS. 5A-5C may be formed by sputter deposition on a substrate maintained at temperature between about 400-700° C.

Figure 6A:
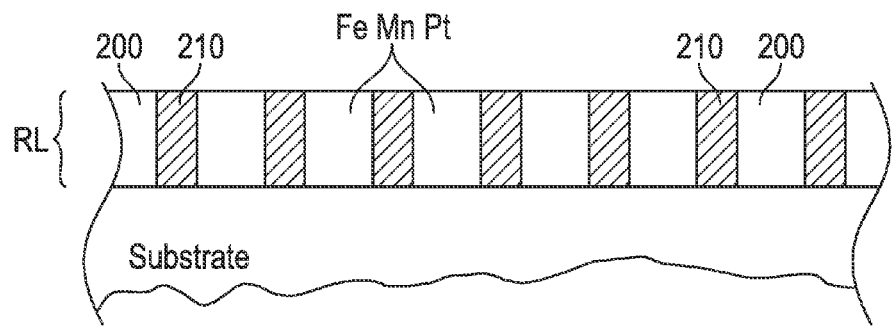
FIG. 6A is a sectional view of a bit-patterned-media (BPM) disk fabricated from the RL of FIG. 4A.
Figure 6B:
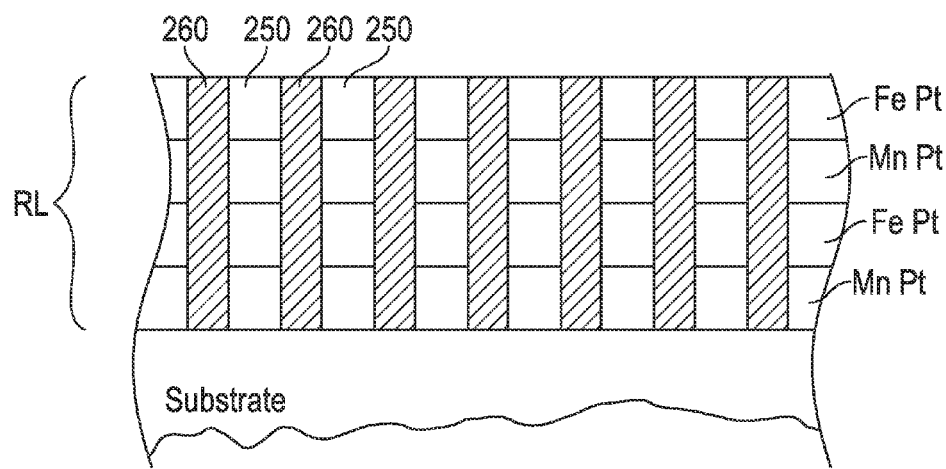
FIG. 6B is a sectional view of a BPM disk fabricated from the multilayer RL of FIG. 5A.

FIG. 6A is a sectional view of a BPM disk fabricated from the RL of FIG. 4A. The RL includes a plurality of patterned discrete spaced-apart data islands 200 separated by nonmagnetic spaces 210. The data islands 200 are formed of the same material as used for the FeMnPt RL in FIG. 4A. FIG. 6B is a sectional view of a BPM disk fabricated from the multilayer RL of FIG. 5A. The RL includes a plurality of patterned discrete spaced-apart data islands 250 separated by nonmagnetic spaces 260. The data islands 250 are formed of the same material as used for the alternating MnPt and FePt layers in FIG. 4A. The non-magnetic spaces 210, 250 in FIGS. 6A, 6B, respectively, may be formed of a non-metallic material such as $SiO_2$, alumina ($Al_2O_3$) or diamond-like carbon (DLC). In a BPM disk the data islands are arranged in concentric data tracks.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. An all-optical magnetic recording system comprising:
   a magnetic recording medium comprising a generally planar substrate and a continuous non-bit-patterned magnetic recording layer on the substrate, the recording layer comprising a FeMnPt alloy wherein Mn is present in said alloy in an amount greater than or equal to 1 atomic percent and less than or equal to 15 atomic percent;
   a laser for generating light;
   a polarizer for polarizing the laser light;
   means for directing the polarized laser light to the recording layer to switch the magnetization of regions of the recording layer; and
   wherein the system does not include a write head for generating a magnetic field.

2. The system of claim 1 wherein the recording layer has a composition of the form $(Fe_{(100-x)}Mn_x)_y Pt_{(100-y)}$, where the subscripts represent atomic percent, y is greater than or equal to 45 and less than or equal to 55 and x is greater than or equal to 2 and less than or equal to 30.

3. The system of claim 1 wherein the recording layer is a single layer having a thickness greater than or equal to 5 nm and less than or equal to 15 nm.

4. The system of claim 1 wherein the recording layer further comprises one or more segregants selected from C, B, BN, SiN, CrN, SiOx, TiOx, TaOx and CrOx.

5. The system of claim 1 wherein the recording layer is a multilayer comprising alternating layers of at least one layer comprising a FePt alloy and at least one layer comprising a MnPt alloy.

6. The system of claim 5 wherein the at least one layer comprising a FePt alloy further comprises one or more segregants selected from C, B, BN, SiN, CrN, SiOx, TiOx, TaOx and CrOx.

7. The system of claim 5 wherein the at least one layer comprising a FePt alloy further comprises one or more segregants selected from C, B, BN, SiN, CrN, SiOx, TiOx, TaOx and CrOx and the least one layer comprising a MnPt further comprises one or more segregants selected from C, B, BN, SiN, CrN, SiOx, TiOx, TaOx and CrOx.

8. The system of claim 5 wherein the ratio of the thickness of said at least one layer comprising a FePt alloy to the thickness of said at least one layer comprising a MnPt alloy is selected such that the amount of Mn present in the multilayer is greater than or equal to 1 atomic percent and less than or equal to 15 atomic percent of the total amount of Fe, Pt and Mn in the multilayer.

9. The system of claim 1 wherein the polarizer is a circular polarizer.

10. The system of claim 1 wherein the means for directing the polarized laser light comprises an optical channel.

11. The system of claim 1 wherein the means for directing the polarized laser light comprises a near-field transducer.

12. An all-optical magnetic recording system comprising:
    a magnetic recording medium comprising a generally planar substrate and a continuous non-bit-patterned recording layer on the substrate and having a composition of the form $(Fe_{(100-x)}Mn_x)_y Pt_{(100-y)}$, where the subscripts represent atomic percent, y is greater than or equal to 45 and less than or equal to 55 and x is greater than or equal to 2 and less than or equal to 30;
    a laser for generating light;
    a polarizer for circularly polarizing the laser light; and
    a transducer for directing the circularly polarized light to the recording layer to switch magnetized regions of the recording layer without the assistance of a magnetic field.

13. The system of claim 12 wherein the recording layer further comprises one or more segregants selected from C, B, BN, SiN, CrN, SiOx, TiOx, TaOx and CrOx.

14. The system of claim 12 wherein the recording layer is a multilayer comprising alternating layers of at least one layer comprising a FePt alloy and at least one layer comprising a MnPt alloy.

15. The system of claim 14 wherein the at least one layer comprising a FePt alloy further comprises one or more segregants selected from C, B, BN, SiN, CrN, SiOx, TiOx, TaOx and CrOx and the least one layer comprising a MnPt further comprises one or more segregants selected from C, B, BN, SiN, CrN, SiOx, TiOx, TaOx and CrOx.

16. The system of claim 12 further comprising an optical channel for directing the circularly polarized light to the transducer.

17. The system of claim 16 wherein the optical channel comprises a waveguide having a substantially planar surface facing the substrate of the magnetic recording medium, and wherein the transducer is formed on said substantially planar waveguide surface.

18. The system of claim 12 wherein the medium is a rotatable disk and the recording layer has a plurality of data tracks, and further comprising a carrier connected to the transducer and an actuator connected to the carrier for moving the carrier to selected data tracks.

* * * * *